United States Patent [19]

Hensel et al.

[11] 4,332,454

[45] Jun. 1, 1982

[54] ASSEMBLY FOR PROCESSING A PHOTOSENSITIVE MATERIAL

[75] Inventors: Roy Hensel, Cranbury; Leonhard F. Biller, Basking Ridge; Russell J. Danson, Millington, all of N.J.

[73] Assignee: American Hoechst Corporation, Somerville, N.J.

[21] Appl. No.: 223,610

[22] Filed: Jan. 9, 1981

[51] Int. Cl.[3] .................... G03B 5/06

[52] U.S. Cl. .................... 354/317; 15/100; 15/231; 118/242; 118/266

[58] Field of Search .................... 354/317, 318, 324, 325, 354/319; 15/100, 102, 231, 232; 118/266, 242

[56] References Cited

U.S. PATENT DOCUMENTS

| | | | |
|---|---|---|---|
| 2,555,874 | 6/1951 | Coughlin | 354/317 |
| 3,903,541 | 9/1975 | Von Meister et al. | 354/317 |
| 3,912,833 | 10/1975 | Becker | 354/317 |
| 4,025,937 | 5/1977 | Lowry et al. | 354/318 |

*Primary Examiner*—L. T. Hix
*Assistant Examiner*—Alan Mathews
*Attorney, Agent, or Firm*—Leo S. Burnett

[57] ABSTRACT

An applicator assembly used in a processor for processing a photosensitive material with a developer liquid, in which an oscillating applicator supports and contacts an open-celled scrubber pad. The developing fluid is pumped through an adapter onto the applicator, which has a plurality of perforations at its front surface contacting the scrubber pad. The developer fluid is distributed through the scrubber pad which serves as a manifold to the surface to be developed and cleans from it unhardened emulsion of the photosensitive material, which passes the scrubber pad, inserted between it and a transport belt.

There are provided means to prevent any shift between the applicator and the scrubber pad which might appear due to the oscillating movement of the applicator assembly transverse to the guide motion of the transport belt, which advances the photosensitive material.

9 Claims, 10 Drawing Figures

ASSEMBLY FOR PROCESSING A PHOTOSENSITIVE MATERIAL

TECHNICAL FIELD

The invention relates to an applicator assembly for processing a photosensitive material with a developer liquid having an oscillating applicator supporting and contacting an open-celled scrubber pad.

BACKGROUND OF PRIOR ART

In the process of automatic developing color proofing film there is known the Encomatic NAPS/PAPS ® Processor of Azoplate, a Division of American Hoechst Corporation, Murray Hill, New Jersey. This processor automatically develops, rinses and dries color proofing films. For processing, a sheet of color proofing film is fed into the feed rollers. A transport belt carries the film sheet through the developer section where it moves through a developer bath and then below an oscillating sponge. Developer is sprayed through the base of the oscillating sponge as it removes the non-hardened emulsion from the film. The film is then transported by rollers which squeegee off the developer.

U.S. Pat. No. 4,025,937 describes an apparatus for processing a web, for example a photographic film, with a liquid processing solution comprising a stationary porous conduit having an inner surface and an outer surface and openings extending from the inner surface to the outer surface. Supply means direct liquid processing solution through the openings in the porous conduit. The emulsion side of the web faces the porous conduit and is supported by a liquid layer of processing solution, and processing occurs as the web is advanced over the porous conduit. The conduit is stationary and has a generally circular cross-section, but may possess any shape provided there are no sharp edges, for example such as an elliptical or convex cross-section. The conduit is stationary, but may also be rotatable about its axis in the case of a generally circular or cylindrical shape. A pressure regulator controls the pressure at which the supply means directs processing solution through the openings of the conduit. An advanced continuous loop transport strip is wrapped helically around the stationary conduit and the web is inserted between the strip and the conduit. The web is pushed against the strip by the outwardly directed liquid from the conduit and the web becomes adjoined to the strip under the influence of liquid cohesion produced by liquid sandwiched between the web and the transport strip.

It is desirable that in the developing station, photosensitive material be not only developed by the deposition of a continuously uniform layer of the processing fluid upon it, but also be cleaned by removing the non-hardened emulsion from its photosensitive surface. Hence, it is important that the developing station provides an applicator capable of gently removing the non-hardened emulsion from the surface of the photosensitive material and of subsequently depositing a metered amount of processing fluid on the photosensitive material during the complete processing time. These problems of achieving a uniform coating of the developing fluid and a gentle cleaning of the surface of the photosensitive material highlight the importance of the structure and the design of the applicator assembly which are essential and critical to the processor system in which the applicator is used.

An object of the invention is to provide an improved applicator assembly in which a support of an open-celled pad is so mounted that it rides almost freely above the processing fluid and the pad makes contact with the photosensitive material to a degree regulated by the hydraulic pressure of the developing fluid.

Another object of the invention is to provide an improved applicator assembly having an oscillating applicator in contact with the foamed pad in a manner that no shifting may occur between the oscillating applicator and the pad supported by the applicator.

A still further object of the invention is to provide an applicator which serves as a manifold to distribute the developing fluid through the applicator and hence through the pad to the surface of the photosensitive material passing under it.

BRIEF SUMMARY OF INVENTION

The present invention discloses an applicator assembly for processing a photosensitive material with a developer liquid, having an oscillating applicator supporting and contacting an open-celled scrubber pad, said applicator being provided with perforations through which the developer liquid under pressure is directed outwardly to penetrate said scrubber pad, to wet and to process a photosensitive layer of the photosensZWKe material, which is inserted between a transport belt and an outer surface of the scrubber pad, said applicator assembly comprising pad holder rods around which longitudinal edges of the scrubber pad are wrapped, said pad holder rods having shouldered rod ends in operative connection with rod holders to clamp the scrubber pad between the pad holder rods and angular longitudinal edges of a channel sub-assembly of the applicator and means for providing an additional contact and/or attachment between the applicator and the scrubber pad to prevent a tightening of the scrubber pad during the oscillating movement of the applicator assembly transverse to the guide motion of the photosensitive material advanced by the transport belt. The means for providing an additional contact between the applicator and the scrubber pad comprises a plurality of parallel grooves of predetermined length and depth, said grooves are formed broadwise at the convex front surface of the applicator.

In an alternate embodiment the means for providing an additional contact between the applicator and the scrubber pad comprises strips of a clasp material (hook and loop) mounted on the convex front surface of the applicator to be in contact with counterparts of these strips, these counterparts being fixed to a rear side of the scrubber pad.

The invention has advantages that the pressure of the scrubber pad against the photosensitive material is decreased, therefore lessening abrasion during development, that the flow of developer liquid through the scrubber pad assists in clearing the foam pad of particles of dyes, pigments, and resins contained in the non-hardened emulsion on the surface of the photosensitive material. These particles are removed from the photosensitive material which the scrubber pad contacts in a manner which avoids any shifting between the pad and the applicator during the oscillating movement of the applicator assembly.

BRIEF DESCRIPTION OF DRAWINGS

The above and other features of the present invention may be more completely understood from the following detailed description taken together with the accompanying drawings in which.

Figure 7:
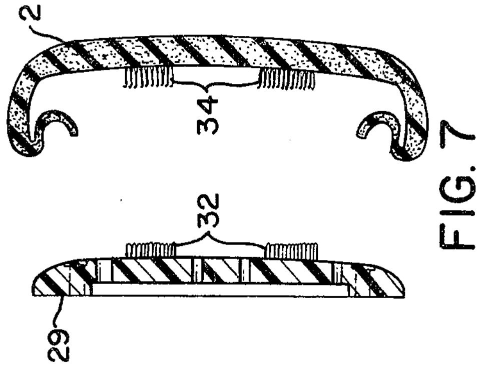
Figure 9:
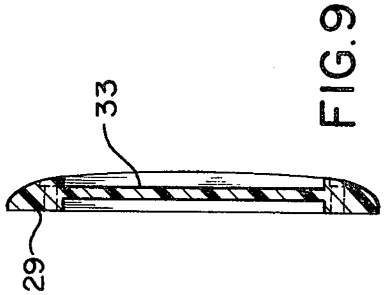
Figure 6:
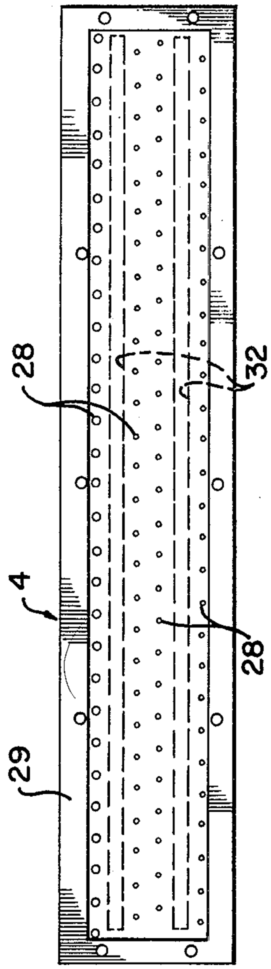
Figure 8:
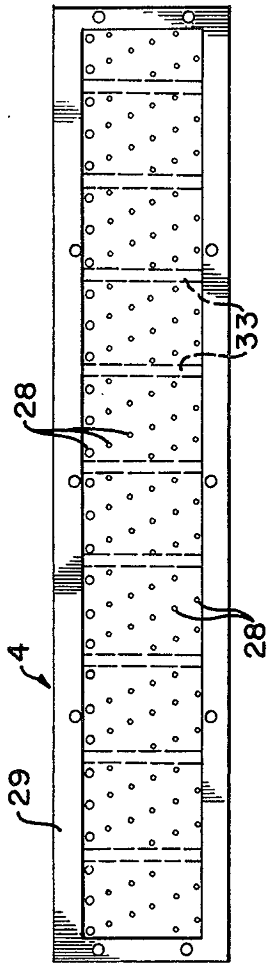

FIG. *5a* shows the inclination between the applicator assembly and the horizontal plane;

FIGS. 6 and 7 are a front view, respectively a side view (FIG. 7) of a further embodiment of the applicator together with a scrubber pad in exploded view; and FIGS. 8 and 9 are a front view and a side view (FIG. 9) respectively, of another embodiment of the applicator.

DETAILED DESCRIPTION OF INVENTION

Because processors for automatically developing, rinsing and drying photosensitive materials such as color proofing films, printing plates and such materials are well-known, the present description will be directed to elements forming part of or cooperating more directly with apparatus of the present invention. In the different figures of the drawing the same reference numerals are used to designate similar parts of the apparatus.

Figure 2:
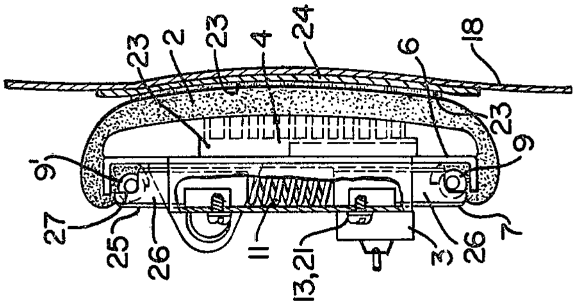
FIG. 2 is a side view in cross-section of the embodiment of FIG. 1.
Figure 1:
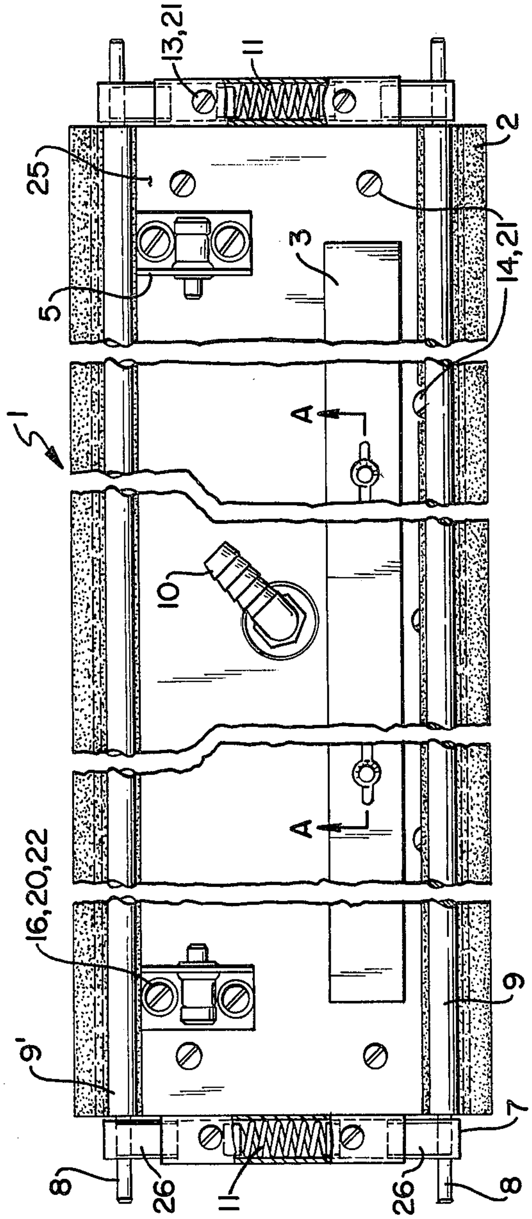
FIG. 1 is a front view of one embodiment of apparatus according to the present invention.

Referring now to FIG. 1, the disclosed embodiment of the invention comprises an applicator assembly 1 with an applicator 4 (FIG. 2) which may have a convex front surface and is mounted on an oscillator, not shown in the drawing. The convex surface of the applicator 4 supports and contacts a scrubber pad 2, for example an open-celled foam pad similar to a sponge, which covers the whole front side of the applicator 4. Each of the two longitudinal edges of the scrubber pad 2 is wrapped around its corresponding pad holder rod 9, and 9$^1$, respectively. The pad holder rods 9, 9$^1$ are located near the longitudinal edges of the applicator 4.

The applicator 1 may be advantageously made of an inert, dimensionally stable plastic. Polyethylene, polypropylene, polyvinyl chloride or polycarbonate may be used. In the case of polyethylene and polypropylene, the ultra-high molecular weight types are preferable.

The oscillating applicator assembly comprises an adaptor 10 (FIG. 1) of the elbow type to connect a conduit or pipe to the rear side of the applicator assembly 1 for pumping developing fluid onto the applicator 4. The applicator assembly 1 is provided with two quick connecting/disconnecting breakout fittings 5 by means of which the assembly may be quickly connected to and also disconnected from the oscillator mechanism, not illustrated, for routine maintenance or service for the applicator assembly 1 or to change it to another applicator assembly.

The applicator assembly 1 is mounted inclined to the horizontal plane at an angle in the range of between about 10 to about 30 degrees within the processor (see FIG. 5*a*), so that a developing fluid 23 (see FIG. 2) pumped through the applicator 4 and the scrubber pad 2 gently removes a non-hardened emulsion from a layer of photosensitive material 24 transported by a transport belt 18. The non-hardened emulsion drains by gravity due to the inclination of the photosensitive material 24 to a developer soak section within the processor not shown.

Figure 3:
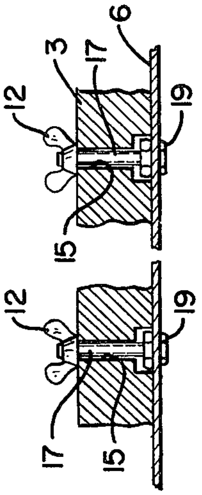
FIG. 3 is a diagrammatical cross-section along the line A—A in FIG. 1.

The adaptor 10 directs liquid developing solution through perforations 28 of the applicator 4 (see FIG. 4) and through open cells of the scrubber pad 2. The photosensitive material 24 is inserted between the transport belt 18 and the outer surface of the scrubber pad 2. Between the layer of the photosensitive material 24 to be processed and the porous scrubber pad 2, there is a thin layer of developing fluid 23 in accordance with FIG. 2. An applicator weight 3 is fastened by means of two or more screws 17, as shown in FIG. 3, to an applicator channel sub-assembly 6 and has an elongated rectangular shape. It extends across nearly the whole length of the applicator 4 next to the lower edge of the applicator in FIG. 1. There are provided boreholes 15 in the applicator weight 3 threaded by the screws 17. Nuts 12, for example wing nuts, are bolted to the screws 17 which also penetrate the applicator channel sub-assembly 6 and are screwed with nuts 19 at the ends opposite to the wing nuts. The applicator weight 3 ensures that the scrubber pad 2 is pressed with a predetermined force of pressure against the surface of the photosensitive material 24 to be developed which passes the developing section.

As shown in FIG. 1 each break-out fitting 5 is fixed to the applicator assembly 1 by means of two screws 16 together with appropriate washers 20 and lock washers 22. A cover 25 on the rear of the applicator assembly 1 is fastened by means of screws 14 and appropriate lock washers 21 to the applicator assembly 1.

The pad holder rods 9, 9$^1$ have shouldered rod ends 8 which extend above the lateral edges of the applicator assembly 1 and are in operative connection with rod holders 7 at both sides of the applicator assembly 1. Each rod holder 7 comprises a compression spring 11 each end of which is in contact with the grip holder element 26 whereby the spring forms with the grip holder elements 26 a straight line. The compression spring 11 presses the grip holder elements 26, which have at their opposite ends to the contact areas with the spring 11, cutouts 21 against the shouldered rod ends 8 of the pad holder rods 9, 9$^1$ so that the scrubber pad 2 is clamped between the pad holder rods 9, 9$^1$ and angular longitudinal edges of the applicator channel sub-assembly 6.

Figure 4:
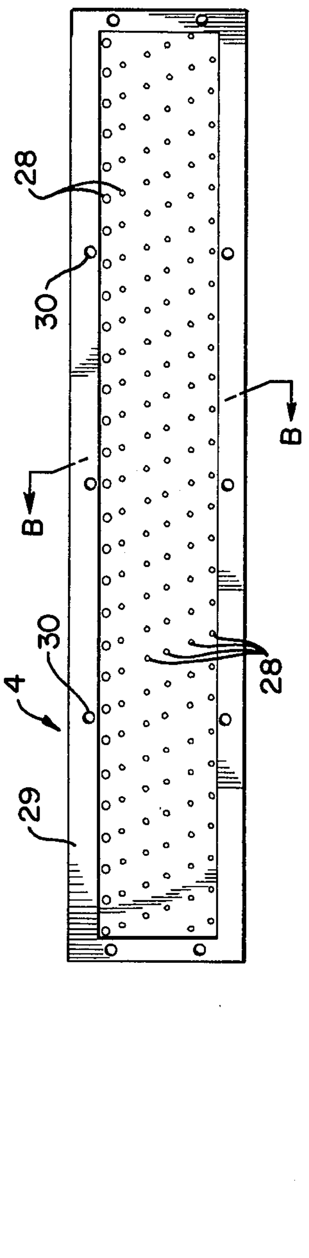
FIG. 4 is a front view of one possible embodiment of an applicator used in the apparatus shown in FIG. 1.

Referring now to FIG. 4, the applicator 4 is provided with a plurality of rows of perforations 28, whereby the perforations 28 of consecutive rows may be staggered. The perforations 28 of the top row have, for example, larger diameters than the perforations of the other rows and serve the principal function, as follows. They provide a more steady flow through of the developing fluid 23 through the perforations 28 than in the case of uniform diameters of all perforations. The reason is that the applicator 4 is inclined against the horizontal plane and in the case of equal diameter of perforations 28 the flow of developing fluid through the top row would be less than through the perforations 28 of the rows below the top row because the pressure of the developing fluid supplied through the adapter 10 decreases from the bottom row to the top row due to gravity. In FIG. 4 it is shown that the top now has perforations with larger diameters than the other rows, but it is also possible, if necessary, to enlarge the perforations of the row below the top row. That depends on the inclination of the applicator 4, the pressure and the composition of the developing fluid, the photosensitive material to be developed and other relevant factors.

Figure 5:
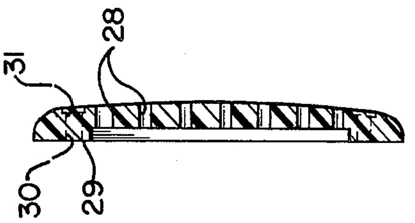
FIG. 5 is a plan view of the applicator in FIG. 4.
Figure 5A:
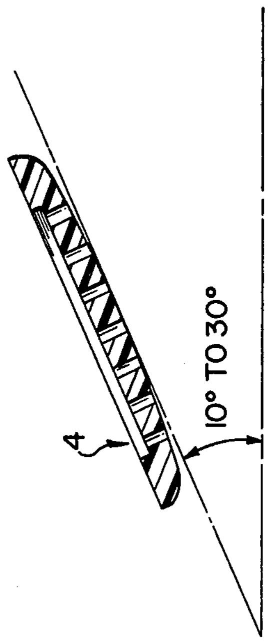

As may be seen from FIG. 5 the surface of the applicator 4, which contacts the scrubber pad, has an elliptical or convex shape. The material of the applicator 4, is preferably plastic, for instance an ultra-high molecular weight polyethylene. Along flange 29 of the applicator 4 there are arranged holes 30 with self-locking inserts 31 to fix the applicator 4 to the applicator channel subassembly 6.

Another embodiment of the applicator 4 is illustrated in FIGS. 6 and 7. This embodiment is similar to the embodiment shown in FIGS. 4 and 5, so that only those elements are described in more detail which are not components of the above-mentioned embodiment. Two parallel strips 32 of a hook and loop material, for example Velcro® material, of predetermined length and width, are attached longitudinally on the convex surface of the applicator 4. The strips 32 may consist only of loops, counterparts 34 to these strips are strips of hooks, schematically shown in FIG. 7, which are fixed to the rear side of the scrubber pad 2 which contacts the surface of the applicator 4. This additional attachment of the scrubber pad 2 on the surface of the applicator 4 by means of the strips 32 guarantees that during a long processing period the geometrical configuration of the scrubber pad 2 is unchanged so that the quality of the developed photosensitive material remains constant. Along with this effect the flow of developer liquid through the scrubber pad 2 is more constant than in the case using an applicator 4 without strips 32, e.g., without the additional attachment of the scrubber pad 2 to the applicator 4.

To make a better contact between the surface of the applicator 4 and the scrubber pad 2, the surface of one further embodiment of the applicator may be roughened in a manner not shown, but to be selectable from those known in the art.

FIGS. 8 and 9 illustrate an embodiment of the applicator 4 having a plurality of parallel grooves or channels 33, of predetermined length and depth, which are formed broadwise in the convex surface of the applicator 4, in the direction of the movement of the transport belt 18 of the applicator assembly 1. These grooves 33 provide means for a better contact between the applicator 4 and the scrubber pad 2 and ensure that the transport belt 18 does not deform the scrubber pad 2 during the transport in a manner that the spraying of the developing liquid through the oscillating scrubber pad 2 becomes discontinuous as it removes the non-hardened emulsion from the photosensitive material 24. Without these grooves 33 in the applicator surface, there may occur a tightening of the scrubber pad 2 due to its oscillating movement transverse to the guide motion of the transport belt 18. This tightening would impair the correct processing of the photosensitive material 24 by the scrubber pad 2 and thereby the quality of the development of the photosensitive material.

The invention has been described in detail with particular reference to preferred embodiments thereof, but it will be understood that the subject matter of the invention may be practiced or embodied in modifications and variations within the spirit and scope of the invention without departing from them. For example, in accordance with the invention, the scrubber pad 2 may be fixed to the applicator 4 by fixing means additional to the clasp strips or the grooves in the applicator. Alternatively, the clasp strips may be formed broadwise on the convex surface of the applicator in the direction of the guide motion of the photosensitive material.

What we claim:

1. An applicator assembly for processing a photosensitive material with a developer liquid, having an oscillating applicator supporting and contacting an open-celled scrubber pad, said applicator being provided with perforations through which the developer liquid under pressure is directed outwardly to penetrate said scrubber pad to wet and to process a photosensitive layer of a photosensitive material, which is inserted between a transport belt and an outer surface of the scrubber pad, said applicator assembly comprising: pad holder rods around which longitudinal edges of the scrubber pad are wrapped; said pad holder rods having shouldered rod ends in operative connection with rod holders to clamp the scrubber pad between the pad holder rods and angular longitudinal edges of a channel sub-assembly of the applicator; and means for providing an additional contact attachment between the applicator and the scrubber pad to prevent a tightening of the scrubber pad during the oscillating movement of the applicator assembly transverse to the guide motion of the photosensitive material advanced by the transport belt.

2. The applicator assembly as claimed in claim 1, wherein said means for providing an additional contact between the applicator and the scrubber pad comprises a plurality of parallel grooves of predetermined length and depth, said grooves formed broadwise at a convex front surface of the applicator.

3. The applicator assembly as claimed in claim 1 wherein said means for providing an additional contact between the applicator and the scrubber pad comprises strips of a clasp material mounted on a convex front surface of said applicator to be in contact with counterparts of these strips, these counterparts being fixed to a rear side of the scrubber pad.

4. The applicator assembly as claimed in claim 1 wherein said perforations in a convex front surface of the applicator contacting the scrubber pad are arranged in a linear array, wherein the perforations of adjacent rows are staggered.

5. The applicator assembly as claimed in claim 4, wherein the applicator is mounted at an inclination between about 10 and about 30 degrees with respect to the horizontal plane and the perforations of the top row of said array have a diameter greater than the diameter of the perforations of the other rows of the array.

6. The applicator assembly as claimed in claim 1 wherein an adapter of the elbow type is provided at the rear side of the applicator, said adapter being connected to a conduit for pumping developing fluid into the interior of the hollow applicator.

7. The applicator assembly as claimed in claim 1 wherein an applicator weight is fastened by attachment means to the applicator channel subassembly, said applicator weight having an elongated rectangular shape extended across nearly the whole length of the applicator channel subassembly next to its lower edge.

8. The applicator assembly as claimed in claim 1 wherein the material of the applicator is a plastic material.

9. The applicator assembly as claim 8, wherein said plastic is selected from the group consisting of ultra-high molecular weight polyethylene, ultra-high molecular weight polypropylene, polycarbonate and polyvinyl carbonate.

* * * * *